(12) United States Patent
Ando et al.

(10) Patent No.: US 8,337,315 B2
(45) Date of Patent: Dec. 25, 2012

(54) PROPELLER SHAFT

(75) Inventors: Junji Ando, Anjo (JP); Tomoo Suzuki, Chita-gun (JP); Tomoki Ogawa, Kariya (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/190,958

(22) Filed: Jul. 26, 2011

(65) Prior Publication Data

US 2012/0028723 A1    Feb. 2, 2012

(30) Foreign Application Priority Data

Jul. 27, 2010 (JP) ................. 2010-168394

(51) Int. Cl.
*F16C 3/03* (2006.01)
*F16N 1/00* (2006.01)
(52) U.S. Cl. .......................... 464/16; 464/162
(58) Field of Classification Search .......... 464/16, 464/162, 182; 403/359.1–359.6; 384/13, 384/29
See application file for complete search history.

(56) References Cited

U.S. PATENT DOCUMENTS

| | | | |
|---|---|---|---|
| 1,973,702 A * | 9/1934 | Cooke | 464/16 |
| 2010/0075766 A1 * | 3/2010 | Neugebauer et al. | 464/162 |
| 2011/0070020 A1 * | 3/2011 | Tabler | 403/359.1 |

FOREIGN PATENT DOCUMENTS

| JP | 04312213 | * 11/1992 |
|---|---|---|
| JP | 6-173934 | 6/1994 |

* cited by examiner

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

A propeller shaft includes a first shaft and a second shaft. The first shaft has a torque transmission face in which a plurality of fine grooves extending in a first direction (face width direction) is formed. The second spline shaft is coupled to the first spline shaft so as to be movable relative to the first spline shaft in the axial direction of the first spline shaft, and has a torque transmission face in which a plurality of second fine grooves extending in a second direction that crosses the first direction is formed.

17 Claims, 7 Drawing Sheets

PROPELLER SHAFT

INCORPORATION BY REFERENCE

The disclosure of Japanese Patent Application No. 2010-168394 filed on Jul. 27, 2010 including the specification, drawings and abstract is incorporated herein by reference in its entirety.

BACKGROUND OF THE INVENTION

1. Field of the Invention

The invention relates to a propeller shaft that includes an input shaft and an output shaft.

2. Description of Related Art

For example, Japanese Patent Application Publication No. 6-173934 (JP 6-173934 A) describes a conventional propeller shaft that includes an input shaft and an output shaft, and that is interposed between a transmission and a differential gear to transmit an output from the transmission to the differential gear.

The input shaft has a cylindrical portion, and is coupled to an output portion of the transmission via a first joint portion.

The output shaft is connected to the input shaft via a telescopic portion, and is also coupled to an input portion of the differential gear via a second joint portion. On the outer periphery of the output shaft, grease used as lubricating oil is applied and a bellow seal member (boots) that covers a part of the cylindrical portion of the input shaft is stretchably provided. With this configuration, the telescopic portion is sealed in the seal member, and therefore the sealing performance is improved.

The telescopic portion has a spline sliding mechanism that has an internal spline and an external spline (an inner periphery spline and an outer periphery spline), and is provided between the inner peripheral face of the cylindrical portion of the input shaft and the outer peripheral face of the output shaft.

With the configuration described above, as the input shaft and the output shaft move relative to each other via the telescopic portion in the axial direction of the propeller shaft, the propeller shaft telescopes accompanied with a stretch or contraction of the seal member.

It is widely known that, in this type of propeller shaft, an intermittent motion of the input shaft and the output shaft (stick-slip) occurs while the propeller shaft telescopes, if the gradient of a straight line indicating the $\mu$-v characteristics is negative. The $\mu$-v characteristics show the relationship between the friction coefficient ($\mu$) and the slide speed (v) of the telescopic portion (between the inner periphery spline and the outer periphery spline).

Therefore, in order to suppress occurrence of stick-slip, it is important to set the gradient of the straight line indicating the $\mu$-v characteristics to a positive gradient, in other words, to reduce an amount of decrease in the slide resistance with respect to an increase in the speed of slide between the inner periphery spline and the outer periphery spline.

The coefficient of friction ($\mu$) between the inner periphery spline and the outer periphery spline is reduced using, for example, grease in order to suppress occurrence of stick-slip. However, the sufficient effect of suppressing occurrence of stick-slip is not obtained.

It is possible to suppress occurrence of stick-slip by performing a coating process with the use of a solid lubricating film, for example, Diamond Like Carbon (DLC). In this case, however, the cost increases.

SUMMARY OF THE INVENTION

The inventor started studies for reducing an amount of decrease in slide resistance with respect to an increase in a speed of slide between an inner periphery spline and an outer periphery spline in order to obtain an effect of suppressing occurrence of stick-slip at low cost. During the study, the inventor found that, if a tooth face of the inner periphery spline has fine grooves extending in a direction that crosses a direction in which fine grooves formed in a tooth face of the outer periphery spline extend, an amount of decrease in the slide resistance with respect to an increase in the speed of slide between the inner periphery spline and the outer periphery spline is reduced.

It is an object of the invention to provide a propeller shaft in which the gradient of a line indicating the $\mu$-v characteristics is set to a positive gradient without performing a coating process with the use of, for example, DLC.

An aspect of the invention relates to a propeller shaft, including: a first spline shaft that has a torque transmission face in which a plurality of first fine grooves extending in a first direction is formed; and a second spline shaft that is coupled to the first spline shaft so as to be movable relative to the first spline shaft in the axial direction of the first spline shaft, and that has a torque transmission face in which a plurality of second fine grooves extending in a second direction that crosses the first direction is formed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereafter, a propeller shaft according to an embodiment of the invention will be described in detail with reference to the accompanying drawings.

Figure 1:
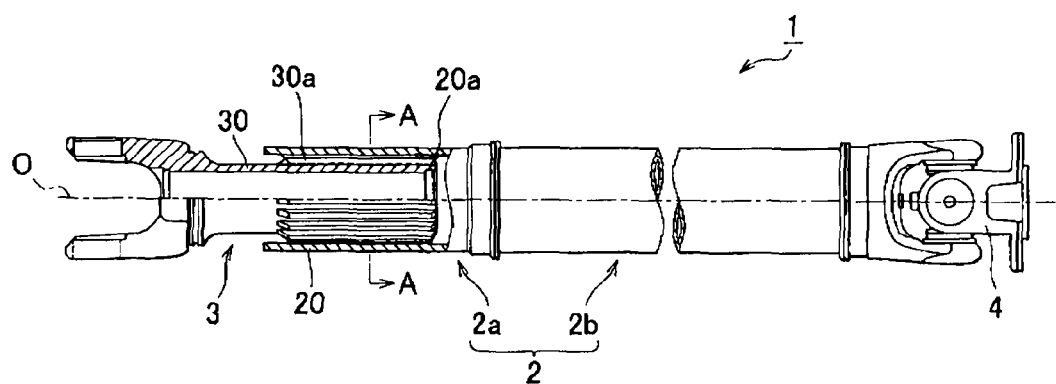
FIG. 1 is a partial sectional view for illustrating an overall propeller shaft according to an embodiment of the invention.
Figure 2:
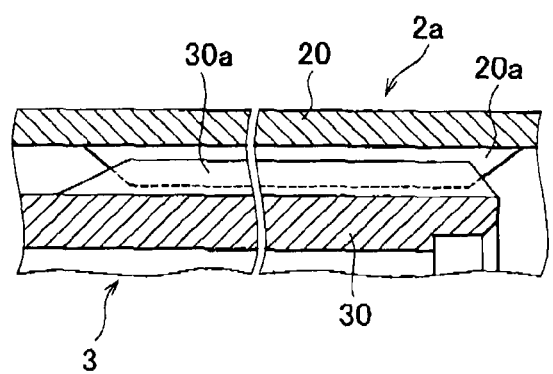
FIG. 2 is a sectional view for illustrating a spline-engagement portion of the propeller shaft according to the embodiment of the invention.
Figure 3:
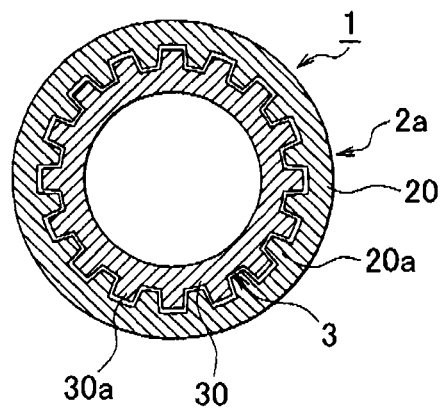
FIG. 3 is a sectional view taken along the line A-A.

The overall structure of a propeller shaft 1 for a vehicle will be described. FIG. 1 shows the entirety of the propeller shaft 1. FIGS. 2 and 3 show a spline-engagement state of the propeller shaft 1. As shown in FIGS. 1 to 3, the propeller shaft 1 includes a first shaft 2 and a second shaft 3, and is interposed between a transmission (not shown) and a differential gear (not shown). The propeller shaft 1 is structured so as to transmit a driving force from an engine to the differential gear via the transmission.

A bellow seal member (not shown) is stretchably fitted to the propeller shaft 1. The seal member is made of, for example, rubber, and used to provide sealing between an inner periphery spline portion (spline portion 20 described later) and an outer periphery spline portion (spline portion 30 described later). Grease used as lubricating oil is sealed in the seal member.

The structure of the first shaft 2 will be described. The first shaft (first spline shaft) 2 has two shaft portions 2a and 2b, which differ in outer diameter. The small-diameter shaft portion 2a is coupled to the second shaft 3 so as to be movable relative to the second shaft 3 in its axial direction. In addition, the large-diameter shaft portion 2b is coupled to the transmission via a universal joint 4. The entirety of the first shaft 2 is formed of a hollow internal spline shaft made of Carbon Steels for machine structure use (SC Steel), for example, S30C.

The small-diameter shaft portion 2a has the spline portion 20 in its inner peripheral face. The small-diameter shaft portion 2a is a portion of the first shaft 2, located on the differential gear side. Inner periphery spline teeth 20a that extend along the axial direction O of the first shaft 2 are formed in the outer peripheral face of the spline portion 20. The inner periphery spline teeth 20a will be described later in detail.

The large-diameter shaft portion 2b is a portion of the first shaft 2, located on the transmission side. The large-diameter shaft portion 2b is welded to the small-diameter shaft portion 2a.

The structure of the second shaft 3 will be described. The second shaft (second spline shaft) 3 has the spline portion 30, corresponding to the spline portion 20 of the first shaft 2 (small-diameter shaft portion 2a), in its outer peripheral face. The second shaft 3 is coupled to the differential gear via a universal joint (not shown). The entirety of the second shaft 3 is formed of a hollow external spline shaft made of SC steel, for example, S35C. The second shaft 3 is configured to be movable in the axial direction O and rotatable together with the first shaft 2 due to spline-engagement with the first shaft 2.

Outer periphery spline teeth 30a that are spline-engaged with the inner periphery spline teeth 20a are formed in the spline portion 30.

Figure 4:
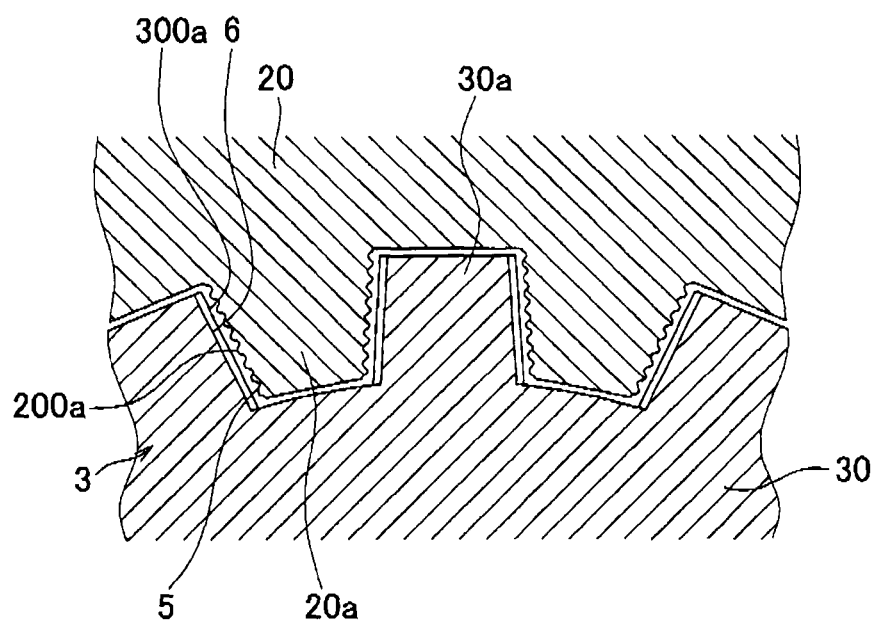
FIG. 4 is a schematic sectional view for illustrating a main portion of the propeller shaft according to the embodiment of the invention.
Figure 5A:
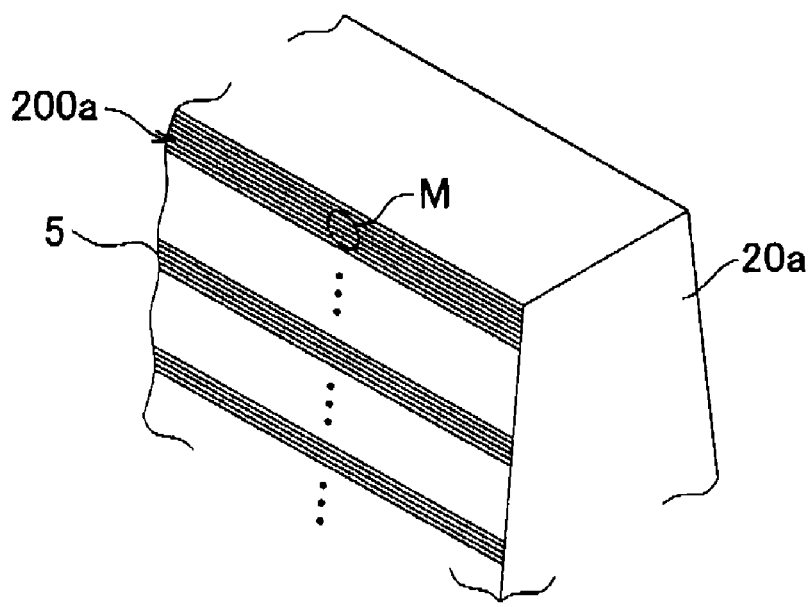
FIG. 5A is a perspective view for illustrating a tooth face of a first spline shaft in the propeller shaft according to the embodiment of the invention.
Figure 5B:
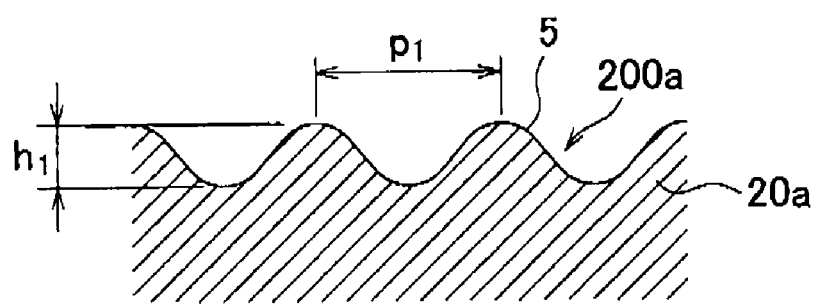
FIG. 5B is a sectional view of a portion M of the tooth face of the first spline shaft.
Figure 6A:
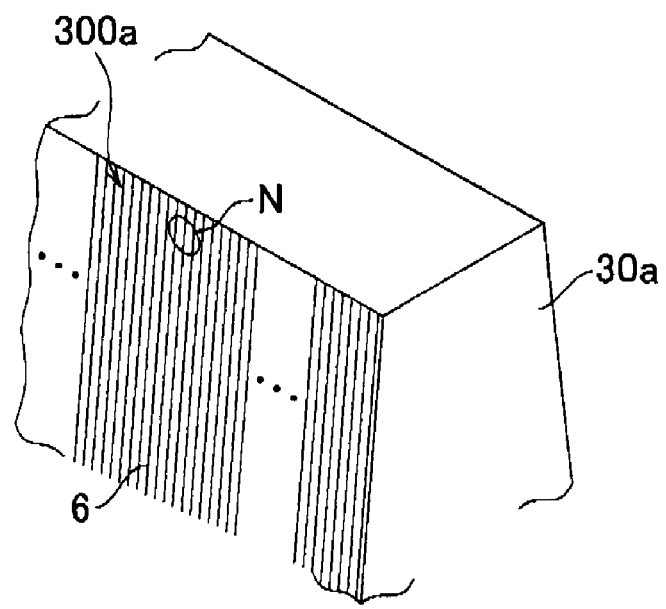
FIG. 6A is a perspective view for illustrating a tooth face of a second spline shaft in the propeller shaft according to the embodiment of the invention.
Figure 6B:
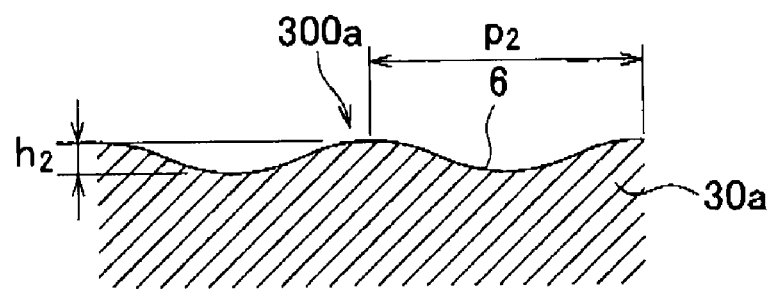
FIG. 6B is a sectional view of a portion N of the tooth face of the second spline shaft.

The outer periphery spline teeth 30a and the inner periphery spline teeth 20a will be described with reference to FIGS. 4 to 6. FIG. 4 is an enlarged view showing a spline-engagement state of the propeller shaft. FIGS. 5A and 5B each show an inner periphery spline tooth. FIGS. 6A and 6B each show an outer periphery spline tooth. As shown in FIG. 4, the inner periphery spline teeth 20a are formed in the spline portion 20 of the first shaft 2 (shown in FIG. 3), and the outer periphery spline teeth 30a are formed in the spline portion 30 of the second shaft 3 (shown in FIG. 3).

As shown in FIG. 5A, each of the inner periphery spline teeth 20a has a plurality of first fine grooves 5 formed of oil grooves that open at a torque transmission face (tooth face) 200a and that extend in the face width direction (axial direction O of the first shaft 2) that is the first direction.

The first fine grooves 5 are formed in the tooth face 200a of the inner periphery spline tooth 20a, within a range from the tooth bottom face to the tooth top face. The first fine grooves 5 are aligned so as to be parallel to each other. As shown in FIG. 5B, the first fine grooves 5 are formed such that the groove pitch $p_1$ is equal to or larger than 100 μm and equal to or smaller than 500 μm (100 μm≦$p_1$≦500 μm), and the groove depth $h_1$ is equal to or larger than 5 μm and equal to or smaller than 40 μm (5 μm≦h1≦40 μm).

On the other hand, as shown in FIG. 6A, each of the outer periphery spline teeth 30a has a plurality of second fine grooves 6 formed of oil grooves that open at a torque transmission face (tooth face) 300a, and that extend in the second direction (direction extending from the booth bottom face to the tooth top face of each of the outer periphery spline teeth 30a) that is perpendicular to the first direction along which the first fine grooves 5 extend, in the spline-engagement state (state in which the inner periphery spline teeth 20a are in contact with the corresponding outer peripheral spline teeth 30a).

The second fine grooves 6 are formed in the tooth face 300a of the outer periphery spline tooth 30a. The second fine grooves 6 are aligned so as to be parallel to each other in the face width direction. As shown in FIG. 6B, the second fine grooves 6 are formed such that the groove pitch $p_2$ is equal to or larger than 1 mm and equal to or smaller than 2 mm (1 mm≦$p_2$≦2 mm), and the groove depth $h_2$ is equal to or larger than 2 μm and equal to or smaller than 8 μm (2 μm≦$h_2$≦8 μm). The second fine grooves 6 may be formed by adjusting the processing speed during formation (hobbing) of the outer periphery spline teeth 30a.

The operation of the propeller shaft 1 according to the embodiment of the invention will be described with reference to FIG. 1.

The propeller shaft 1 according to the embodiment operates when an automobile travels. That is, when the automobile starts and travels, a suspension for wheels operates and changes in the length and angle between the universal joints 4 (only one of them is shown) are allowed. Then, a driving force is transmitted from the engine to the differential gear via the transmission and the propeller shaft 1.

In this case, if the first shaft 2 moves relative to the second shaft 3 via the internal spline teeth 20a in the axial direction or the second shaft 3 moves relative to the first shaft 2 via the external spline teeth 30a in the axial direction, the propeller shaft 1 telescopes in the axial direction accompanied with a stretch or contraction of the seal member (not shown).

When the inner periphery spline teeth 20a and the outer periphery spline teeth 30a are engaged with each other, the tooth face 200a of each of the inner peripheral spline teeth 20a and the tooth face 300a of the corresponding one of the external spline teeth 30a are brought into point contact at multiple points. Therefore, the area of contact between the inner periphery spline teeth 20a and the outer periphery spline teeth 30a is reduced, which reduces the reaction force against hydraulic pressure generated by the grease, which is applied to the tooth face 200a of each of the internal spline teeth 20a and the tooth face 300a of each of the external spline teeth 30a. Therefore, lubrication is maintained even if the slide speed increases.

Thus, in the embodiment, it is possible to reduce an amount of decrease in the slide resistance between the inner periphery spline teeth 20a and the outer periphery spline teeth 30a. As a result, it is possible to suppress occurrence of stick-slip.

Observation on the effect of suppressing occurrence of stick-slip in the propeller shaft 1 according to the embodiment will be described with reference to FIGS. 7 to 10.

Figure 7:
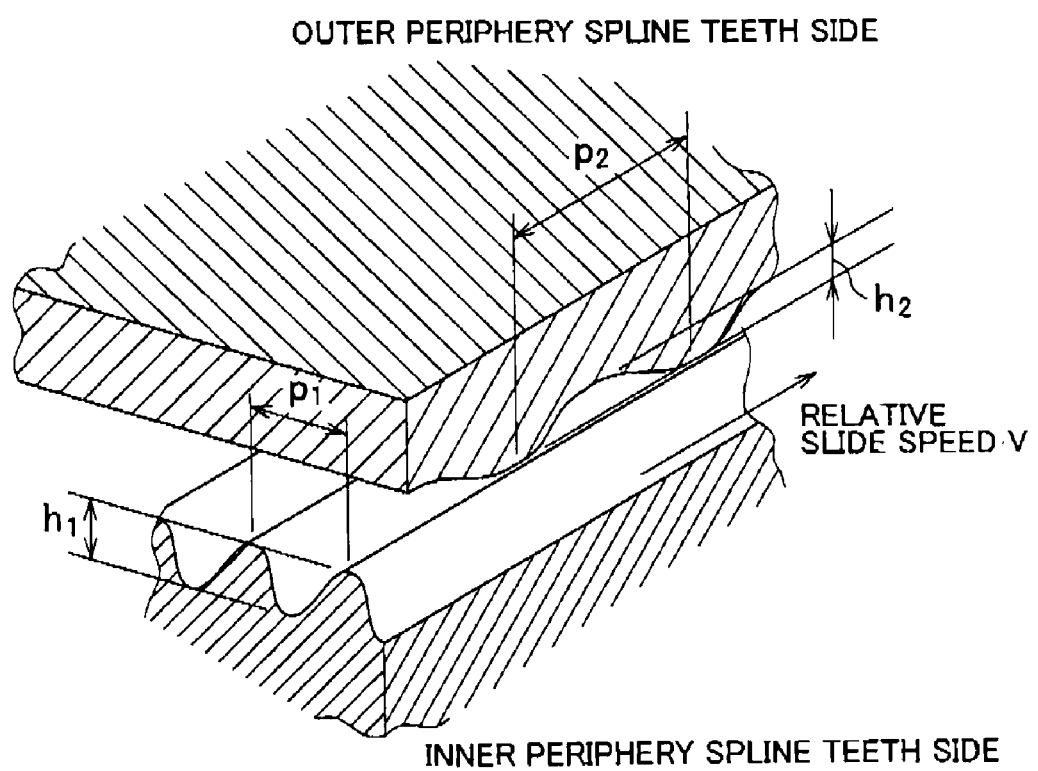
FIG. 7 is a perspective view for illustrating a measuring method when there is obtained an effect of suppressing occurrence of stick-slip in the propeller shaft according to the embodiment of the invention.

First, an internal spline shaft having fine grooves and an internal spline shaft having no fine grooves are provided. These internal spline shafts are spline-engaged with external spline shafts having fine grooves (hob grooves). In this way, two types of propeller shafts are produced. There was measured the torque T that was transmitted from the internal spline shaft (first shaft 2) to the external spline shaft (second shaft 3) when the two types of propeller shafts were rotated at a predetermined speed and the internal and external spline shafts of each propeller shaft were operated at a relative slide speed V ($0 < V \leq 0.5$ m/sec) as shown in FIG. 7. Note that, the torque $T_0$ when the relative slide speed V is 0 (V=0) is set to 1 ($T_0$=1), and the torque T is a torque with respect $T_0$ when V is 0.05 to 0.5 (V=0.05 to 0.5).

Figure 8A:
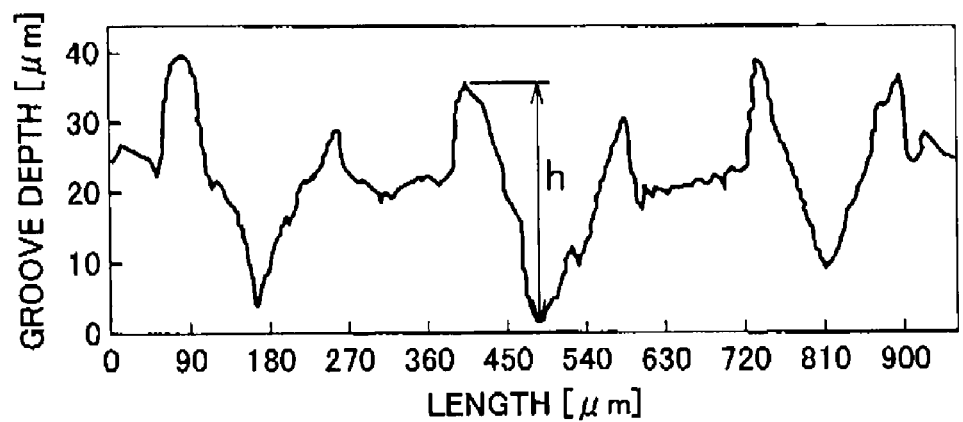
FIGS. 8A and 8B each are a graph showing a cross-sectional profile of a tooth face of an internal spline shaft of the propeller shaft according to the embodiment of the invention.
Figure 8B:
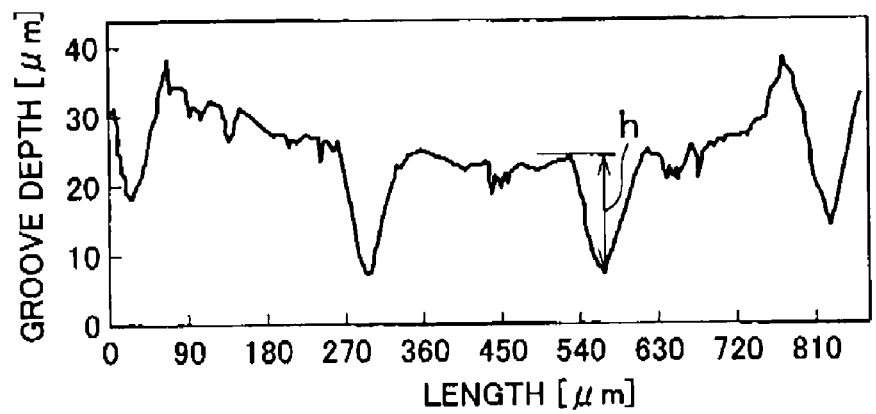
Figure 9:
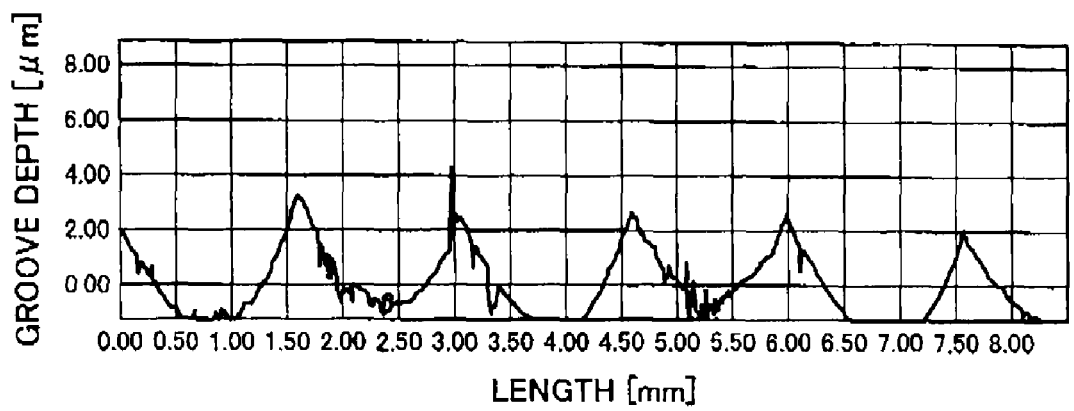
FIG. 9 is a graph showing a cross-sectional profile of a tooth face of an external spline shaft of the propeller shaft according to the embodiment of the invention.

As a result, it was confirmed that, in the propeller shaft formed by spline-engaging the internal spline shaft having fine grooves with the external spline shaft having hob grooves, if the dimensions of the fine grooves of the spline shafts satisfy the following conditions, an amount of decrease in the slide resistance between the internal and external spline shafts is reduced and the effect of suppressing occurrence of stick-slip is obtained. The conditions include the condition that the groove pitch $p_1$ of the fine grooves of the internal spline shaft is equal to or larger than 100 μm and equal to or smaller than 500 μm (100 μm $\leq p_1 \leq$ 500 μm) and the groove depth $h_1$ is equal to or larger than 5 μm and equal to or smaller than 40 μm (5 μm $\leq h_1 \leq$ 40 μm), and the condition that the groove pitch $p_2$ of the hob grooves of the external spline shaft is equal to or larger than 1 mm and equal to or smaller than 2 mm (1 mm $\leq p_2 \leq$ 2 mm) and the groove depth $h_2$ is equal to or larger than 2 μm and equal to or smaller than 8 μm (2 μm $\leq h_2 \leq$ 8 μm). FIGS. 8A and 8B each show an example of a cross-sectional profile of the fine groove of the internal spline shaft when the effect of suppressing occurrence of stick-slip is obtained. FIG. 9 shows an example of a cross-sectional profile of the hob groove of the external spline shaft when the effect of suppressing occurrence of stick-slip is obtained.

In contrast, in the propeller shaft formed by spline-engaging the internal spline shaft having no fine grooves with the external spline shaft having hob grooves, an amount of decrease in the slide resistance between the internal and external spline shafts increases. As a result, the desired effect of suppressing occurrence of stick-slip is not obtained.

Figure 10:
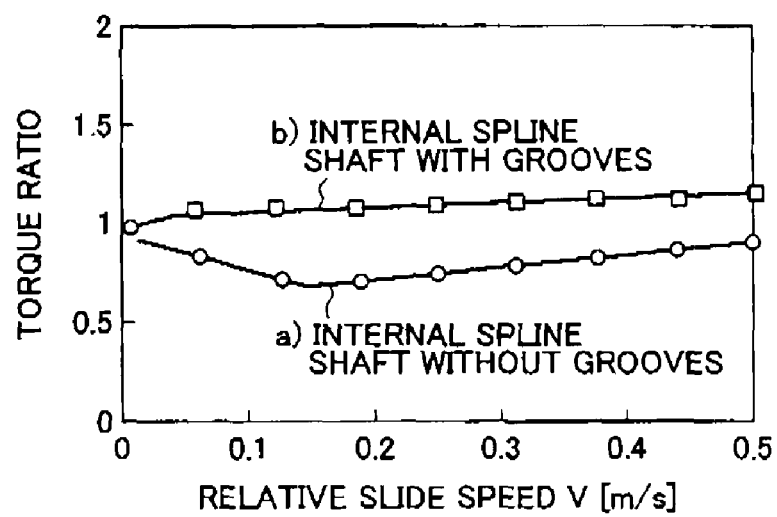
FIG. 10 is a graph showing the results of observation on the effect of suppressing occurrence of stick-slip in the propeller shaft according to the embodiment of the invention.

This is shown in FIG. 10. FIG. 10 is a graph showing the results of observation on the effect of suppressing occurrence of stick-slip in the propeller shaft. FIG. 10 shows a case a) where the internal spline shaft has no grooves and a case b) where the internal spline shaft has grooves. In the case a), the gradient of the line indicating the T-V characteristics (V=0 to 0.013) showing the relationship between the torque ratio T and the relative slide speed V is negative. In the case b), the gradient of the line showing the T-V characteristics is positive. In FIG. 10, the ordinate axis represents the torque ratio, and the abscissa axis represents the relative slide speed.

According to the embodiment described above, the following effects are obtained.

It is no longer necessary to perform a coating process with the use of DLC or to decrease the coefficient μ of friction between the first spline shaft 2 and the second spline shaft 3 using, for example, grease. Therefore, it is possible to sufficiently obtain the effect of suppressing occurrence of stick-slip.

The propeller shaft according to the invention has been described based on the above embodiment. However, the invention is not limited to the embodiment described above, and may be implemented in various forms within the scope of the invention. For example, the following modification may be made.

1) In the embodiment described above, the second fine grooves 6 extend in the second direction (direction extending from the tooth bottom face to the tooth top face of each of the outer periphery spline teeth 30a) that is perpendicular to the first direction (face width direction of each of the inner periphery spline teeth 20a) in which the first fine grooves 5 extend. However, the invention is not limited to this configuration. The second direction in which the second fine grooves extend is not particularly limited as long as the second direction crosses the first direction in which the first fine grooves extend.

2) In the embodiment described above, SC steel is used as the material for each of the first shaft 2 and the second shaft 3. However, the invention is not limited to this. As long as the same level of mechanical strength as that in the embodiment is ensured, other materials such as carbon fiber reinforced plastic (CFRP) may be used.

3) In the embodiment described above, the first shaft 2 is coupled to the transmission, and the second shaft 3 is coupled to the differential gear. However, the invention is not limited to this configuration. The second shaft may be coupled to the transmission, and the first shaft, and the first shaft may be coupled to the differential gear.

What is claimed is:

1. A propeller shaft, comprising:
    a first spline shaft that has a first torque transmission face;
    a plurality of first elongated grooves extending along the first torque transmission face of the first spline shaft in a first direction;
    a second spline shaft that is coupled to the first spline shaft so as to be movable relative to the first spline shaft in an axial direction of the first spline shaft, and that has a second torque transmission face; and
    a plurality of second elongated grooves extending along the second torque transmission face of the second spline shaft in a second direction that crosses the first direction.

2. The propeller shaft according to claim 1:
    wherein the first grooves of the first spline shaft are oil grooves that extend in the axial direction; and
    wherein the second grooves of the second spline shaft are oil grooves that extend in a direction that is perpendicular to the axial direction.

3. The propeller shaft according to claim 2:
    wherein the first spline shaft is formed of an internal spline shaft; and
    wherein the second spline shaft is formed of an external spline shaft.

4. The propeller shaft according to claim 2, wherein a groove pitch of the first grooves of the first spline shaft is set to a value smaller than a groove pitch of the second grooves of the second spline shaft.

5. The propeller shaft according to claim 4:
    wherein dimensions of the first grooves are set such that a groove depth is equal to or larger than 5 μm and equal to or smaller than 40 μm; and
    wherein dimensions of the second grooves are set such that a groove depth is equal to or larger than 2 μm and equal to or smaller than 8 μm.

6. The propeller shaft according to claim 5:
wherein the first spline shaft is formed of an internal spline shaft; and
wherein the second spline shaft is formed of an external spline shaft.

7. The propeller shaft according to claim 4:
wherein dimensions of the first grooves are set such that the groove pitch is equal to or larger than 100 μm and equal to or smaller than 500 μm; and
wherein dimensions of the second grooves are set such that the groove pitch is equal to or larger than 1 mm and equal to or smaller than 2 mm.

8. The propeller shaft according to claim 7:
wherein the first spline shaft is formed of an internal spline shaft; and
wherein the second spline shaft is formed of an external spline shaft.

9. The propeller shaft according to claim 4:
wherein the first spline shaft is formed of an internal spline shaft; and
wherein the second spline shaft is formed of an external spline shaft.

10. The propeller shaft according to claim 1, wherein a groove pitch of the first grooves of the first spline shaft is set to a value smaller than a groove pitch of the second grooves of the second spline shaft.

11. The propeller shaft according to claim 10:
wherein dimensions of the first grooves are set such that the groove pitch is equal to or larger than 100 μm and equal to or smaller than 500 μm; and
wherein dimensions of the second grooves are set such that the groove pitch is equal to or larger than 1 mm and equal to or smaller than 2 mm.

12. The propeller shaft according to claim 11:
wherein the first spline shaft is formed of an internal spline shaft; and
wherein the second spline shaft is formed of an external spline shaft.

13. The propeller shaft according to claim 10:
wherein dimensions of the first grooves are set such that a groove depth is equal to or larger than 5 μm and equal to or smaller than 40 μm; and
wherein dimensions of the second grooves are set such that a groove depth is equal to or larger than 2 μm and equal to or smaller than 8 μm.

14. The propeller shaft according to claim 13:
wherein the first spline shaft is formed of an internal spline shaft; and
wherein the second spline shaft is formed of an external spline shaft.

15. The propeller shaft according to claim 10:
wherein the first spline shaft is formed of an internal spline shaft; and
wherein the second spline shaft is formed of an external spline shaft.

16. The propeller shaft according to claim 1:
wherein the first spline shaft is formed of an internal spline shaft; and
wherein the second spline shaft is formed of an external spline shaft.

17. The propeller shaft according to claim 1,
wherein the first spline shaft has a plurality of first spline teeth and the second spline shaft has a plurality of second spline teeth,
wherein the first torque transmission face is provided on at least one of the first spline teeth, and
wherein the second torque transmission face is provided on at least one of the second spline teeth.

* * * * *